United States Patent

Sakakibara et al.

Patent Number: 4,657,122
Date of Patent: Apr. 14, 1987

[54] CENTRIFUGAL FRICTION CLUTCH AND COUPLING MECHANISM USING SUCH CLUTCH

[75] Inventors: Shiro Sakakibara; Shigeo Tsuzuki, both of Anjo, Japan

[73] Assignee: Aisin-Warner Limited, Anjo, Japan

[21] Appl. No.: 665,395

[22] Filed: Oct. 26, 1984

[30] Foreign Application Priority Data

Oct. 31, 1983 [JP] Japan ................................ 58-205298
Oct. 31, 1983 [JP] Japan ................................ 58-205299

[51] Int. Cl.$^4$ .............................................. F16D 43/04
[52] U.S. Cl. ........................... 192/3.31; 192/105 CE; 192/105 CD
[58] Field of Search .................... 192/3.31, 103 B, 76, 192/105 CE, 105 CD

[56] References Cited

U.S. PATENT DOCUMENTS

| | | | |
|---|---|---|---|
| 3,251,445 | 5/1966 | Zuck et al. ................... | 192/105 CD |
| 4,083,440 | 4/1978 | Silberschlag ................. | 192/3.31 |
| 4,117,918 | 10/1978 | Silberschlag ................. | 192/3.31 X |
| 4,305,493 | 12/1981 | Silberschlag ................. | 192/105 CE X |
| 4,383,596 | 5/1983 | Jackel ........................ | 192/105 CE X |

FOREIGN PATENT DOCUMENTS

685361  4/1964  Canada ...................... 192/105 CD

Primary Examiner—Rodney H. Bonck
Assistant Examiner—Alan G. Towner
Attorney, Agent, or Firm—Pahl, Lorusso & Loud

[57] ABSTRACT

A centrifugal type friction clutch, comprising: a first rotary coupling member provided with a plural number of friction element support means on the outer peripheral portions thereof; a second rotary coupling member having a cylindrical inner peripheral surface disposed coaxially with the outer periphery of the first rotary coupling member and provided with a frictional engaging surface thereon; and friction coupling elements respectively supported by the friction element support means and displaceable radially outward according to the rotational speed of the first rotary coupling member for engagement with the frictional engaging surface of the second rotary coupling member; each one of the friction coupling elements comprising an arcuate friction shoe with a frictional engaging surface on the outer periphery thereof, a resilient retractor means located between the friction shoe and friction element support means, and a cam means pivotally supported on the first rotary coupling member for pressing the friction shoe radially outward under the influence of centrifugal force.

16 Claims, 20 Drawing Figures

CENTRIFUGAL FRICTION CLUTCH AND COUPLING MECHANISM USING SUCH CLUTCH

BACKGROUND OF THE INVENTION (i) Field of the Invention

This invention relates to a centrifugal type friction clutch which permits a greater freedom in setting variations of torque capacity in power transmission, and a coupling or starter mechanism employing such a centrifugal friction clutch.

(ii) Description of the Prior Art

Figure 2:
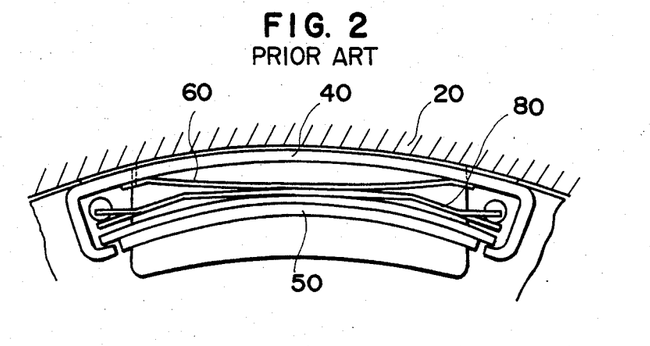
Figure 3:
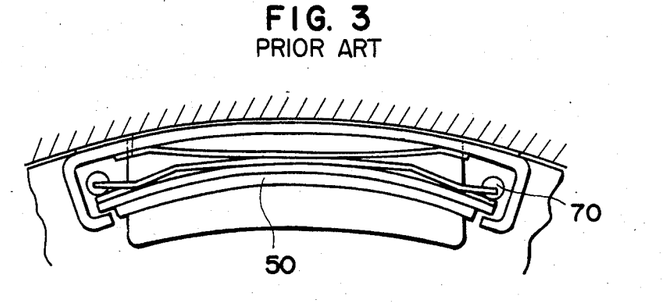

There have been known and used in the art the so-called lock-up clutches for coupling mechanisms in vehicular automatic transmissions for the purpose of enhancing the efficiency of power transmission. The lock-up clutches are generally classified as either a piston type or a centrifugal type, of which the piston type has drawbacks in that it incurs a high cost and requires a complicated control. With regard to the centrifugal type lock-up clutch, U.S. Pat. No. 4,305,493 discloses a centrifugal type friction clutch using a slidable friction shoe 40 having an engaging portion and end portions folded inwardly in a C-shape, as shown in FIGS. 1 to 3, here in combination with a centrifugal weight 50 held in the folded end portions, a load spring 60 interposed between and abutting against the centrifugal weight 50 and friction shoe 40, and a retractor spring 80 interposed between the load spring 60 and centrifugal weight 50 and abutting, at its ends against, a pair of projections 70 provided on one rotary coupling member.

The prior art centrifugal type friction clutch illustrated in FIGS. 1–3 in the manner as follows.

Figure 1:
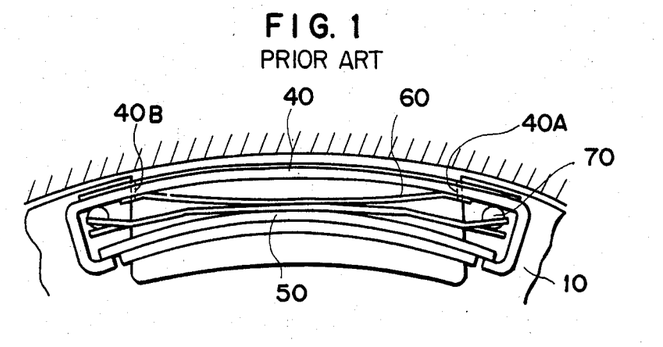
FIGS. 1 to 3 are schematic front views of a centrifugal type friction clutch.

(a) Los-speed non-operating range (FIG. 1)

The friction shoe 40 is abutted against the paired projections 70 by the reaction force of the retractor spring 80, forming a leading contact portion 40A in driving power transmission and a leading contact portion 40B in driven power transmission, at the opposite ends portions of the friction shoe 40 and load spring 60.

(b) Middle- & low-speed centrifugal clutch range (FIG. 2)

The friction shoe 40, centrifugal weight 50 and retractor spring 80 are urged toward the engaging surface of the opposing rotary coupling member, and the friction shoe 40 and centrifugal weight 50 are separated from each other by centrifugal force.

(c) High-speed operation range (FIG. 3)

As the rotational speed is increased, the centrifugal weight 50 is abutted against the paired projections 70. Consequently, the centrifugal weight 50 will exert no further load acting on the engaging surface of the apposing rotary coupling member.

When the above-described centrifugal friction clutch is used on a motor vehicle, it becomes necessary to raise the operating range of the lock-up clutch above a certain rotational speed to reduce engine torque variations to the point of ensuring comfortable drive of the vehicle. However, in the case of conventional clutches employing centrifugal weights, the clutch torque capacity varies in the fashion of a quadratic curve as shown by the characteristics curve Co of FIG. 16, and becomes smaller at low speeds, broadening the clutch slippage region in the ordinary operating range of the lock-up clutch. This is a great disadvantage from the standpoint of transmission efficiency and durability of the clutch.

SUMMARY OF THE INVENTION

It is an object of the present invention to provide a centrifugal type friction clutch which guarantees a large clutch torque capacity in a low speed range, along with a smooth rise in the clutch torque capacity.

It is another object of the present invention to provide a centrifugal type friction clutch which has a more compact construction by the use of less heavy weights.

It is still another object of the invention to provide a coupling mechanism or a starter utilizing such a centrifugal friction clutch.

According to the present invention, there is provided a centrifugal type friction clutch, comprising: a first rotary coupling member provided with a plural number of friction element support means on the outer peripheral portions thereof; a second rotary coupling member having a cylindrical inner peripheral surface disposed coaxially with the outer periphery of the first rotary coupling member and provided with a frictional engaging surface thereon; and friction coupling elements respectively supported by the friction element support means and displaceable radially outward according to the rotational speed of the first rotary coupling member for engagement with the frictional engaging surface of the second rotary coupling member; each one of the friction coupling elements comprising an arcuate friction shoe with a frictional engaging surface on the outer periphery thereof, a resilient retractor means located between the friction shoe and friction element support means, and a cam means pivotally supported on the first rotary coupling member for pressing the friction shoe in a radially outward direction under the influence of centrifugal force.

According to the invention, there is also provided a coupling mechanism, comprising in combination: a disk connected to an input or output shaft and provided with friction element support portions; a drum connected to an output or input shaft and disposed coaxially around the outer periphery of the disk; a lock-up clutch constituted by friction elements each including an arcuate friction shoe supported on the disk and having a frictional engaging surface on the outer periphery thereof, a cam weight pivotally supported on the disk and movable in a radially outward direction to press the friction shoe under influence of centrifugal force and retractor spring located between the support portions and the friction shoe and supported at the opposite end thereof on the support portions of the disk, and a frictional engaging surface provided on the inner periphery of the drum; and a fluid coupling provided between the input and output shafts.

The centrifugal type friction clutch of the invention with the foregoing construction provides the following effects.

(a) The torque capacity in a low speed range is increased by the synergistic effect of centrifugal force and the wedging action of the cam weight which is pivoted by the centrifugal force.

(b) It becomes possible to have a smooth rise of the torque capacity by appropriately shaping the cam weight surface, and to use a light and compact weight owing to the synergistic effect of the centrifugal force and the wedging action of the cam weight.

(c) Accordingly, the durability of the clutch can be improved, in addition to the improvement of mileage by the enhanced transmission efficiency at low speeds.

The above and other objects, features and advantages of the invention will become apparent from the following description and the appended claims, taken in conjunction with the accompanying drawings which show by way of example some preferred embodiments of the invention.

DESCRIPTION OF PREFERRED EMBODIMENTS

Hereafter, the centrifugal type friction clutch of the invention is described more particularly by way of the preferred embodiments shown in the drawings.

Figure 4:
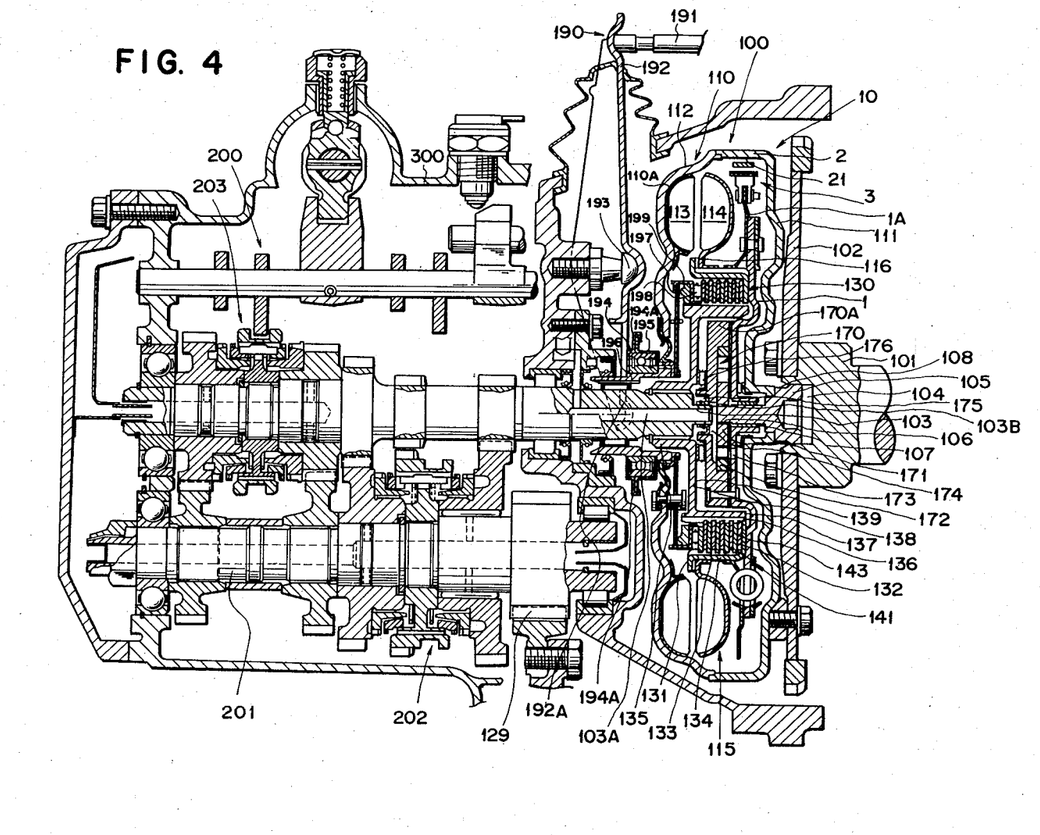
FIG. 4 is a schematic section of a torque converter and a vehicular transmission assembly, incorporating a centrifugal type friction clutch according to the present invention.
Figure 6:
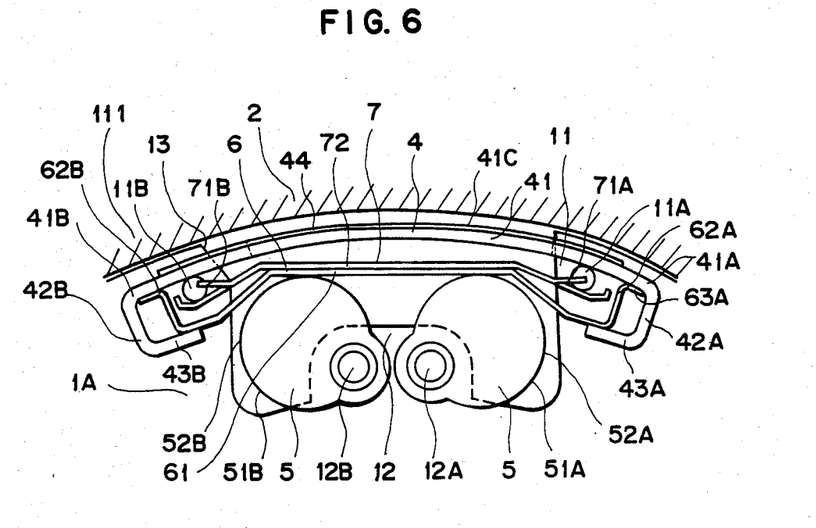
FIGS. 6 to 8 are schematic front views employed to explain operation of the centrifugal friction clutch of the invention.

Referring to FIGS. 4 and 6, there is illustrated a first embodiment of the centrifugal friction clutch of the invention, incorporated as a lock-up clutch into a vehicular automatic transmission with a fluid coupling.

Figure 5:
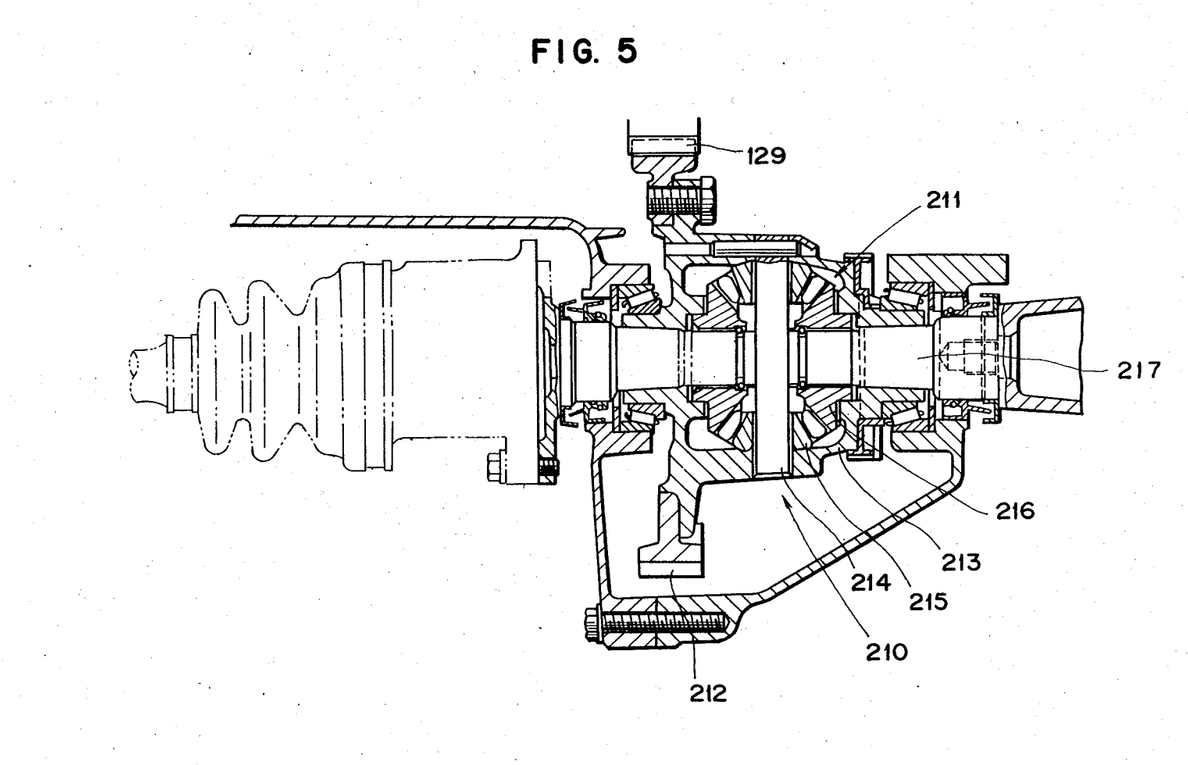
FIG. 5 is a schematic section of a differential mechanism of a vehicular transmission assembly, incorporating a centrifugal type friction clutch according to the present invention.

FIGS. 4 and 5 show a transmission for F—F type motor vehicles, employing as a starter a fluid coupling with a lock-up clutch embodying the centrifugal type friction clutch of the invention, the transmission consisting of a coupling mechanism 100, a transmission gear mechanism 200 with 4 forward and 1 reverse speed ranges, a differential mechanism 210, and a transmission case 300 accommodating these mechanisms.

The coupling mechanism 100 includes: a fluid coupling 110 (hereinafter referred to simply as "coupling" for brevity); a power cut-off clutch 130 (hereinafter referred to simply as "clutch" for brevity) mounted on the inner side of the fluid coupling; a lock-up clutch 10 provided in an outer peripheral portion of the coupling 110 on the side of the engine in the particular embodiment shown (on the right side and the term "right side" has the same meaning in the following description); an oil pump 170 provided between input and output members of the coupling 110; and a servo mechanism for engaging and releasing the clutch 130.

The coupling 110 includes: a front cover 111 coupled through a drive plate 102 to an input shaft 101 of the coupling mechanism, which is connected to the engine crank shaft; an annular plate-like rear cover 110A welded at its outer periphery to the front cover 111; an annular pump shell 112 secured circularly to the outer side of the inner peripheral wall surface of the rear cover 110; jump blades 113 provided on and around the inner wall surface of the pump shell 112; turbine blades 114 provided opposingly to the pump blades 113; and a turbine runner 115 retaining the turbine blades 114. Pressed centrally through the front cover 111 is a center shaft 108 forming a pilot boss 105 at a large diameter portion on the side of the engine for fitting engagement with a pilot hole 104 formed centrally on the end face of the input shaft 101, a drive shaft 106 for the oil pump 170 at the fore end on the side of the transmission gear mechanism (on the left side and the term "left side" has the same meaning in the following description), and a disk plate retaining shaft 107 in the middle portion supporting the disk plate 1 for axial sliding movement. Further, the front cover 111 is formed with a frictional engaging surface 21 on the inner side of its outer peripheral wall which forms a drum portion 2 disposed perpendicular to the axis of the transmission and serving as the other rotary coupling member.

The clutch 130 includes: a cylindrical clutch plate case 134 having a radially extending flange portion 131 at its left end welded to a hub portion 116, a radially drawn support wall 132 at its right end welded to the disk plate 1 of the clutch 130, and an inner spline formed on its inner peripheral wall; a clutch disk wheel 139 having a hub portion 135 splined to the output shaft 103 of the coupling mechanism, a clutch hub portion 137 with an outer spline formed on its outer periphery in a position opposing the inner spline 133 of the clutch plate case 134, and a disk portion 138 connecting the hub portion 135 with the clutch hub portion 137; a plural number of clutch plates 141 having the outer peripheries thereof splined to the clutch plate case 134; and clutch disks 143 having the inner peripheries thereof splined to the clutch hub portion 137 of the clutch disk wheel 139 and interposed alternately with the clutch plates 141.

The lock-up clutch 10 is constituted by a frictional engaging surface 21 formed on the inner periphery of the drum portion 2 of the front cover 111 and friction elements supported on the lock-up clutch output disk 1A (hereinafter referred to simply as "disk" for brevity) serving as a first rotary coupling member.

The disk 1A is positioned between the front cover 111 and turbine runner 115 as shown particularly in FIGS. 4 and 6, and is in the form of an annular plate. FIG. 6 shows one of plural notches 13 formed at uniform intervals on the outer periphery of disc 1A for mounting friction of elements 3. Further, a plural number of paired projections 11A and 11B which serve as support means are provided at uniform intervals on side walls of large radial extensions 11 of the disk 1A, and a plural number of paired support shafts 12A and 12B which also serve as a second support means are provided at uniform intervals on side walls of small radial extensions 12 of the disk 1A. A friction element 3 which is supported on each pair of projections 11A and 11B is displaced radially outward according to the rotational speed for engagement with the frictional engaging surface 21 on the drum portion 2 of the front cover 111. The plural number of paired projections 11A and 11B as well as the plural number of paired support shafts 12A and 12B are anchored in position in and across the disk 1A, and the friction elements 3 are hooked on the projections at the opposite ends thereof.

The frictional coupling members 3 are each include a friction shoe 4, a cam weight 5, a load spring 6, and a retractor spring 7.

Figure 9:
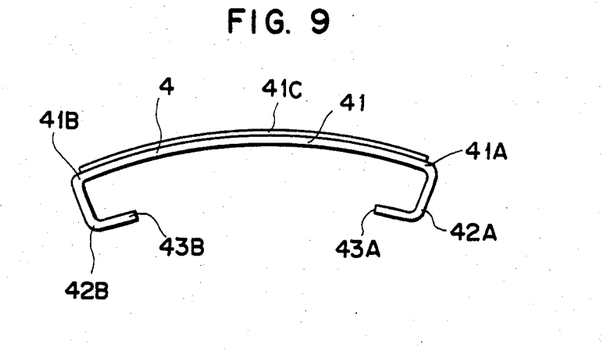
FIG. 9 is a schematic front view of a friction shoe in a first embodiment of the centrifugal friction clutch of the present invention.
Figure 10:
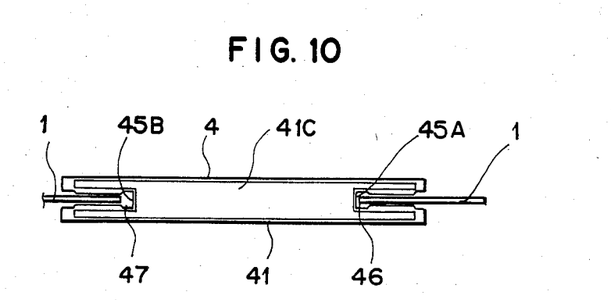
FIG. 10 is a schematic plan view of the friction shoe in the first embodiment.

As shown particularly in FIG. 6, the friction shoe 4 overlaps paired projections 11A and 11B, and, as illustrated in FIGS. 9 and 10, it includes an arcuate portion 41 with a frictional engaging surface 41C on the outer periphery thereof, stopper portions 42A and 42B extending radially inward from the opposite end portions 41A and 41B of the arcuate portion 41, and inwardly folded end portions 43A and 43B folded inward from the radially extending stopper portions 42A and 42B, respectively.

As seen in FIG. 6, a friction material 44 is provided on the outer periphery of the arcuate portion 41, and, as shown in FIG. 10, a groove 45 which holds the disk 1A at one end 41A of the arcuate portion 41 forms a leading contact portion in engine drive power transmission, while a groove 45B at the other end 41B forms a clearance 47 between the arcuate portion and the disk 1A. At this time, the frictional coupling surface 41C is engaged with the opposing frictional coupling surface 21 on the drum portion 2 of the front cover 111.

The cam weights 5 are pivotally supported on the support shafts 12A and 12B of the disk 1A on the inner peripheral side thereof, and rotatably supported thereon on the radially inner side of the friction shoe 4 and paired projections 11A and 11B. The cam weights 5 are provided with cam surfaces 52A and 52B on their circumferential surfaces 51A and 51B, and have the respective centers of gravity in positions offset relative to the rotational axes thereof.

Figure 11:
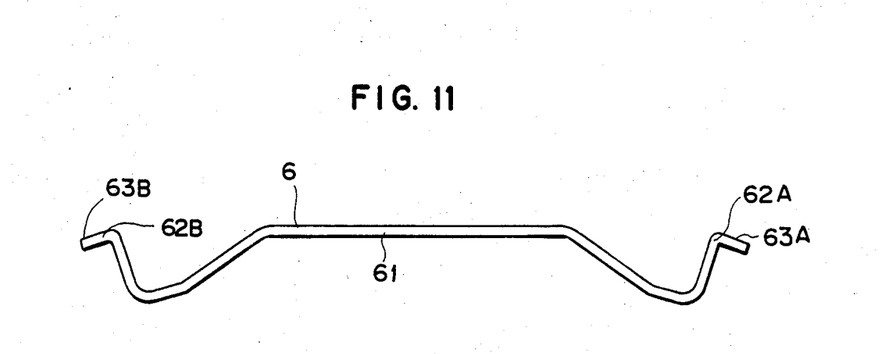
FIG. 11 is a schematic front view of a load spring in the first embodiment.
Figure 12:
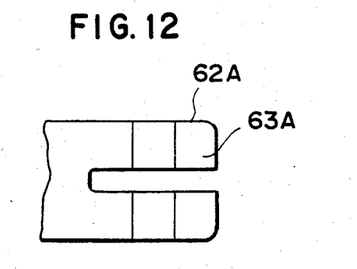
FIG. 12 is a schematic plan view of an end portion of the load spring in the first embodiment.

The load spring 6 is interposed between the cam weights 5 and the friction shoe 4 as shown in FIGS. 11 and 12 to urge them away from each other, and has its center portion 61 abutted against a plural number of cam weights 5. At the opposite end portions 62A and 62B, the load spring 6 is provided with contact portions 63A and 63B in engagement with the stopper portions 42A and 42B of the friction shoe 4.

Figure 13:
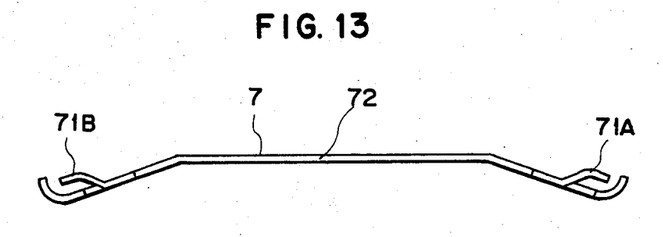
FIG. 13 is a schematic front view of a retractor spring in the first embodiment.
Figure 14:
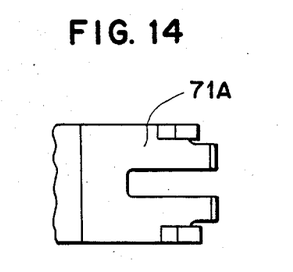
FIG. 14 is a schematic plan view of an end portion of the retractor spring in the first embodiment.

The retractor spring 7 is biased against paired projections 11A and 11B at its opposite end portions 71A and 71B as shown in FIGS. 13 and 14, and has its center portion 72 abutting against a center portion 61 of the load spring 6.

In the particular embodiment shown in FIG. 4, the oil pump 170 is an inscribing gear pump, which is located within the clutch disk wheel 139 in a position between the disk plate 1 and the disk portion 138 of the clutch disk wheel 139. This oil pump includes: a casing 170A which is secured at its outer periphery to the disk plate 1, loosely fitted at its inner periphery on the small diameter portion 103B at the fore end of the output shaft 103 of the coupling mechanism through an oil seal 175, and abutted against the disk portion 138 of the clutch disk wheel 139 through a thrust bearing 176; an internal gear 172 rotatably fitted in a recess provided in the casing 170A on the side of the engine; an external gear 171 splined on the fore end of the center shaft 108; and a suction port 174 in communication with the oil passage 103A formed centrally through the output shaft 103, and a discharge port 173 in communication with the coupling 110.

The servo mechanism 190 of the clutch 130 includes: a connecting rod 191 linked to a servo mechanism operated by the clutch pedal beside the driver's seat or by the intake manifold vacuum or automaic charge and discharge of a fluid passage or the like; a pressure rod 192 turned about a fulcrum point 193 by the connecting rod 191; a bearing case 194 having a flange 194A in abutting engagement with the fore end of the pressure rod 192; a bearing 195 fitted in the bearing case; a sliding sleeve 196 fitted in the bearing 195; a diaphragm spring 197 having the inner peripheral edge thereof abutted against the right end of the sliding sleeve 196; and a pressure ring 199 engaged with the outer peripheral edge of the diaphragm spring 197 to press the clutch 130 through a bearing 198. The clutch 130 is released and slided (half-coupling) automatically or by a driver's effort.

The transmission gear mechanism 200 is of a known construction and utilizes the output shaft of the coupling mechanism as its input shaft, the transmission gear mechanism 200 further including: an output shaft 201 mounted parallel with the input shaft; a dog clutch 202 for shifts between first and second speeds; a dog clutch 203 for shifts between third and fourth speeds; and a reverse gear which is not shown.

Further, as illustrated in FIG. 5, an output gear 129 which is mounted on a drive portion of the output shaft 201 is meshed with a ring gear 212 of a differential gear assembly 211 of the differential mechanism 210, thereby transmitting the power of the output shafts 201 from the ring gear 212 to the side gear 216 through case 213, spider 214 and pinion 215 and to drive wheels through an axle 217.

The operation of the centrifugal friction clutch according to the invention is hereafter described with reference to FIGS. 4, 6 to 8, 15 and 16.

(1) Behaviors of cam weights

The cam weights 5 which are rotatably mounted on the support shafts 12A and 12B are rotated with the turbine runner 115 at the same rotational speed (r.p.m.), and, since the centers of gravity of the respective cam weights 5 are located off the center axes of the support shafts 12A and 12B, they are thrown radially outward by the centrifugal force, each generating a rotational moment about the support shaft 12A or 12B (hereinafter referred to as "centrifugal torque of the cam weight 5").

This centrifugal torque of the cam weight 5 varies depending upon the rotational speed of the turbine runner 115, location of the center of gravity, effective radius of the cam weight 5 and so forth, and becomes smaller with a larger rotational angle of the cam weight 5, reaching a 0 (zero) level when the rotational axis of the cam weight 5 (the axis of the support shaft 12A or 12B) is aligned with the center of gravity and the center of the turbine runner 115, as expressed by the following equation.

$$Tc = Fc \times rg \times \sin \alpha$$

wherein:

$$Fc = w/g \times R \times (2\pi N/60)^2;$$

Tc = the centrifugal torque of the cam weight;
Fc = the centrifugal force acting on the center of gravity of the cam weight;
rg = the distance from the axis of the support shaft to the center of gravity;
g = the gravitational acceleration;
w = the weight of the cam weight;
N = the rotational speed of the turbine runner (r.p.m.);
R = the distance from the center of the turbine runner to the center of gravity of the cam weight; and
α = the angle of a straight line passing through the axis of the support shaft and the center of gravity of the cam weight relative to the acting direction of the centrifugal force (the angle being taken as positive if in the rotational direction of the cam weight 5).

Following are observations on the forces which act on the contact areas of the cam surfaces 52A and 52B with the load spring 6.

When the cam weights 5 are pivoted by the aforementioned centrifugal torque, the force Fr (a force tending to push the load spring 6 radially outward) which occurs at the contact portions between the cam surfaces 52A and 52B and the load spring 6 varies depending upon the wedging effect which in turn varies according to the shape of curved cam surfaces 52A and 52B relative to the center of rotation of the cam weights 5. Therefore, by suitably shaping the cam surfaces 52A and 52B of the cam weights 5, the pressure which is applied to the load spring 6 by the centrifugal torque can be precisely set in relation to the rotational speed of the turbine runner 115.

Figure 15:
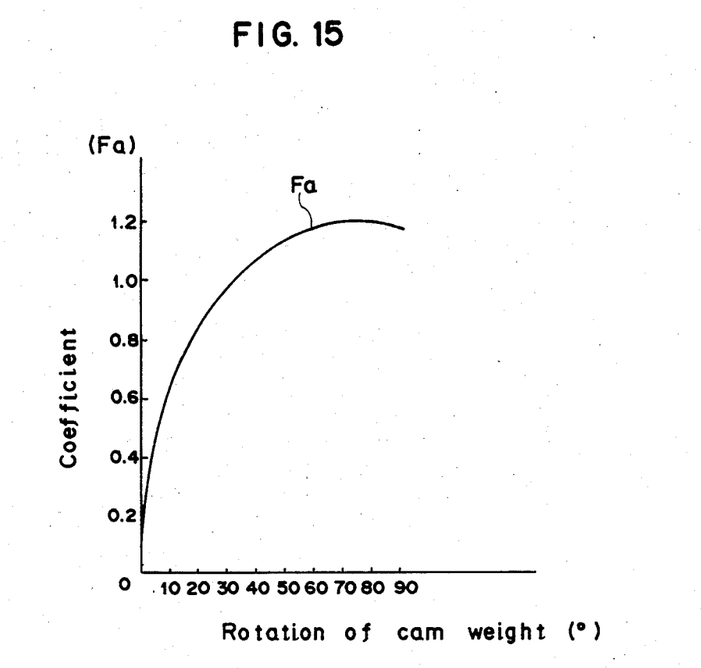
FIG. 15 is a diagram showing behavior of a cam weight in the first embodiment.

Namely, the force with which the cam weights 5 tend to push the friction shoe 4 outward varies depending upon the centrifugal torque and the wedging effect varying according to the rotation of the cam weights, as plotted in FIG. 15. (Fr/Fc = coefficient Fa) Although FIG. 15 shows only one example, it will be seen therefrom that there is a region where the force of the cam weights which push the load spring 6 in a radially outward direction is greater than the centrifugal force acting on the cam weights 5. This implies that it is possible to use lighter cam weights by positively utilizing the wedging effect thereof.

Figure 16:
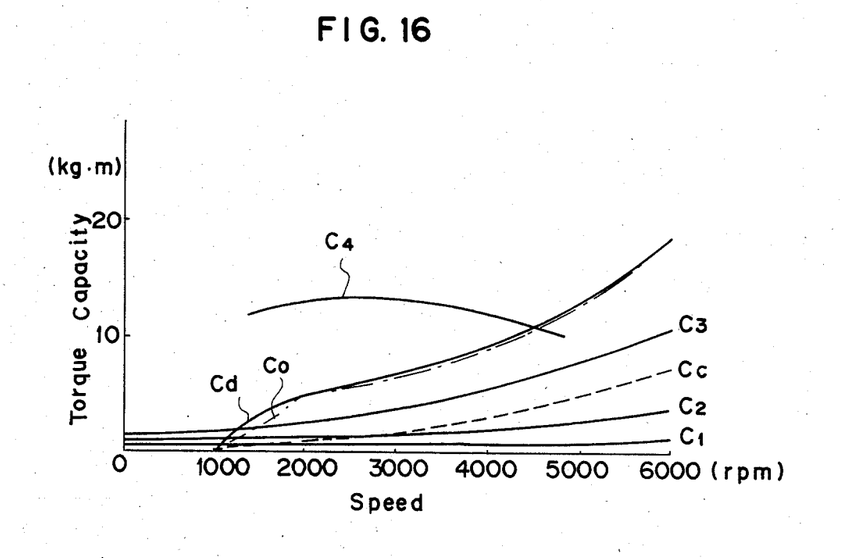
FIG. 16 is a diagram of clutch torque capacity of the centrifugal friction clutch of the first embodiment.

(2) FIG. 16 shows the clutch torque capacity which is determined by both the pressure exerted on the friction shoe 4 by the cam weight 5 commensurate with the centrifugal torque and the wedging effect explained in the foregoing paragraph (1), and the presence exerted on the friction shoe 4 and the load spring 6 commensurate with the centrifugal force acting on the friction shoe 4 and the load spring 6 themselves.

In this Figure, indicated by the characteristic curve Cd is the torque capacity of the lock-up clutch in engine drive operation, by Cc is the torque capacity of the lock-up clutch in coasting operation, by C1 is the required torque capacity in the first speed, by C2 is the required torque capacity in the second speed, by C3 is the required torque capacity (travel resistance) in the third speed, and by C4 is the maximum engine torque.

(a) When the rotational speed of the turbine runner is in the range of 0 to 1000 r.p.m., the friction shoe 4 is pushed back in a radially inward direction by the reaction force of the retractor spring 7 as shown in FIG. 6, without transmitting any torque.

Figure 7:
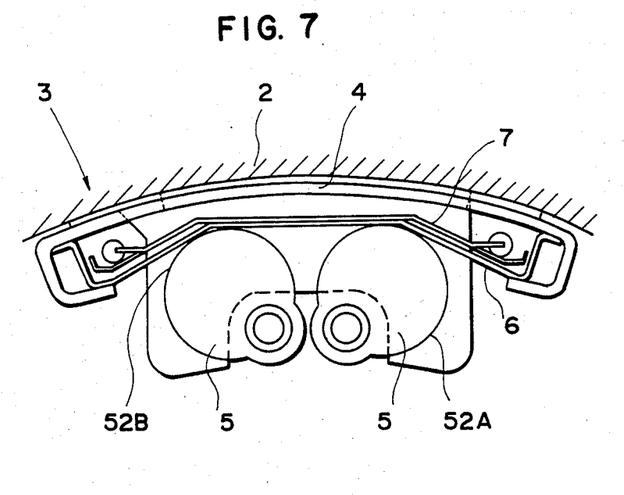

(b) When the turbine runner is rotating at a speed of 1000 to 2000 r.p.m., the lock-up clutch torque Cd is determined by both the centrifugal torque of the cam weights 5 and the centrifugal force on the friction shoe 4 as shown in FIG. 7. The lock-up clutch torque capacity Cd exhibits an upwardly convex characteristic attributable to the wedging effect of the cam weights 5. Accordingly, in the rotational speed range of 1000 to 2000 r.p.m. in which the turbine runner is operated most frequently, it becomes possible to secure a lock-up clutch capacity Cd of a relatively large value as compared with the conventional clutch torque capacity Co in the low speed range. Although the load spring 6, friction shoe 4 and cam weights 5 are pushed back in a radially inward direction by the reaction force of the retractor spring 7 when the turbine runner is at a rotational speed of 0 to 1000 r.p.m., the centrifugal force acting on these components overcomes the reaction force of the retractor spring 7 as the rotational speed of the turbine runner is increased, bringing the friction shoe 4 into contact with the drum portion 2 to initiate torque transmission and holding the friction shoe 4 against the drum portion 2 in a frictionally engaged state.

As the rotational speed is increased further, the centrifugal torque of the cam weights 5 becomes greater, pushing the load spring 6 and retractor spring 7 gradually in a radially outward direction. Accordingly, the load spring 6 which is pushed outward by the cam weights 5 at this time presses the friction shoe 4 against the drum portion 2 to increase the torque capacity of the clutch.

On further increases of the rotational speed, the cam weights 5 come into abutting engagement with each other and stop their operation since they are unable to rotate any further. In this state, the pressure of the cam weights 5 is exerted on the load spring 6 as a reaction force.

Figure 8:
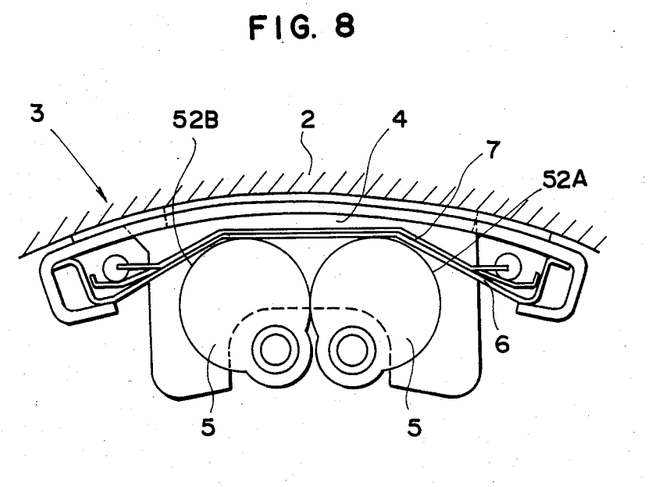

(c) When the turbine runner is at a rotational speed of 2000 to 5000 r.p.m., the clutch torque capacity is determined by the reaction force of the load spring 6, which is deflected in the speed range of 1000 to 2000 r.p.m., and the centrifugal force on the friction shoe 4 itself as shown in FIG. 8, the lock-up clutch torque capacity Cd taking a form of a quadratic curve.

As the rotational speed of the turbine runner is further increased, the load spring 6 is displaced by centrifugal force, separating from the cam weights 5.

(3) Torque capacity in engine drive and coasting operations:

The torque is transmitted through different paths in the engine drive and coasting operations, lowering the lock-up torque capacity Cc in the coasting operation as compared with the torque capacity Cd in the engine drive operation by the loading and trailing effects for the purpose of suppressing uncomfortable shocks.

In a starting operation, the torque transmission is initiated gradually from a turbine runner speed of about 1000 r.p.m., attaining a lock-up clutch torque capacity Cd capable of transmitting torque greater than the travel resistance C3 at a speed higher than 1300 r.p.m.

This ensures a smooth start while preventing excessive slipping of the clutch. The clutch is completely uncoupled during a shift operation, and, upon completion of a shift, it is smoothly coupled according to operating conditions.

Although the centrifugal type friction clutch of the invention is applied as a lock-up clutch of a fluid coupling in the foregoing embodiment, it may be similarly used as a lock-up clutch of torque converters or other starter mechanisms.

(1) The present invention employs the cam weights 5 in contrast to the conventional counterparts, so that it becomes possible to secure a relatively high lock-up clutch torque capacity Cd and a smooth torque curve in a low speed range (where the rotational speed of the turbine runner is about 1000 to 2000 r.p.m.) thanks to the wedging action of the cam weights 5.

(2) The torque curve can be precisely predetermined by suitably shaping the cam surfaces 52A and 52B of the cam weights 5.

(3) It is possible to employ smaller and lighter cam weights 5 owing to the afore-mentioned wedging action.

(4) The lock-up clutch torque capacity Cc in coasting operation can be lowered as a result of the leading and trailing effects (to about ⅓ of the lock-up clutch capacity Cd in engine drive operation), thereby absorbing uncomfortable shocks which would be otherwise felt when the accelerator is off.

The support means for the friction coupling elements which are positioned at uniform intervals in the foregoing embodiment may be located diagonally or otherwise as long as they are rotationally balanced as a whole.

Figure 17:
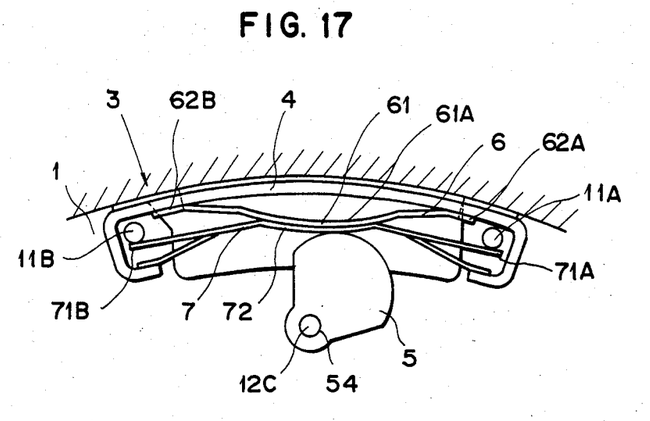
FIG. 17 is a schematic front view of a second embodiment of the centrifugal friction clutch according to the invention.
Figure 18:
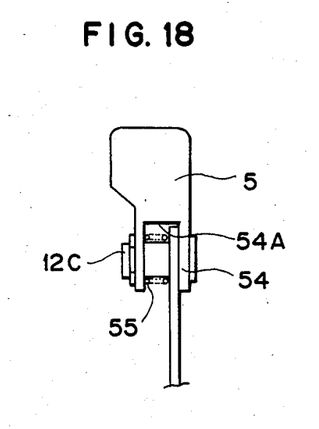
FIG. 18 is a schematic side view of the cam weight included in the second embodiment.

Illustrated in FIGS. 17 and 18 is a second embodiment of the invention, employing friction coupling elements 3 which include: a friction shoe 4 of a shape similar to the first embodiment; a cam weight 5 of a sectoral shape rotatably mounted on a support shaft 12C on a disk 1A and provided with a return spring 55 in a groove 54A in its pivotal base portion 54; a load spring 6 supported by the friction shoe 4 at its opposite ends 62A and 62B and provided with a curved portion 61A in its center portion 61; and a retractor spring 7 interposed between the load spring 6 and cam weight 5 and abutting the cam weight 5 at its center portion 72 to receive the load pressure and against the paired projections 11A and 11B at its opposite ends 71A and 71B.

Figure 19:
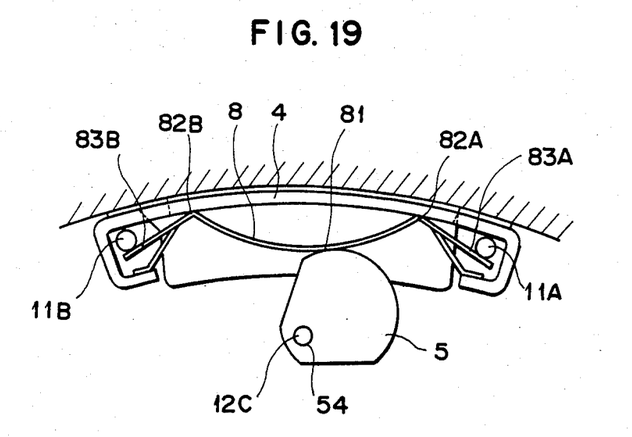
FIG. 19 is a schematic front view of a third embodiment of the centrifugal friction clutch of the invention.

Illustrated in FIG. 19 is a third embodiment of the invention, in which the friction coupling element 3 includes: a friction shoe 4 of a shape similar to the first embodiment; a sectoral cam weight 5 having a base portion 54 similar to the second embodiment; and a retractor spring 8 interposed between the cam weight 5 and friction shoe 4 and including a curved portion 81 abutted against the cam weight 5 and having its hunched portion 82A and 82B supported by the friction shoe 4, and end portions 83A and 83B extended out from the hunched portions 82A and 82B and abutted against the paired projections 11A and 11B.

In this embodiment, the load spring 6 and the retractor spring 7 can be provided as a single structure to reduce the number of parts and the production cost. The pivoting support structure for the cam weight 5 is same as in the second embodiment shown in FIG. 18.

Figure 20:
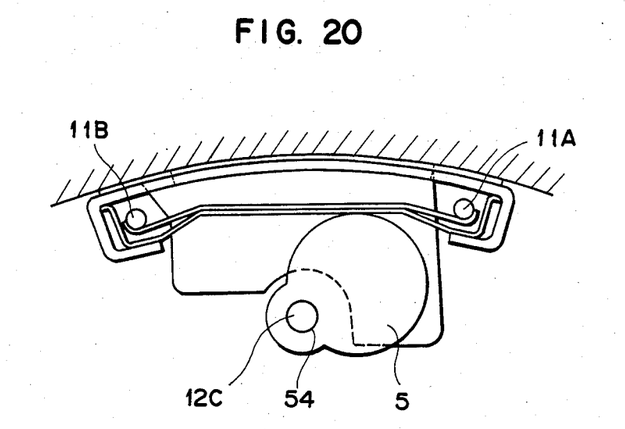
FIG. 20 is a schematic front view of a fourth embodiment of the centrifugal friction clutch of the invention.

Illustrated in FIG. 20 is a fourth embodiment of the invention, which is same as the first embodiment except that a single cam weight 5 is used for the purpose of reducing the number of parts and the production cost. This cam weight 5 is provided with a base portion 54 which is same as in the second embodiment.

Although the invention has been described and shown by way of some preferred embodiments, it is to be understood that it is possible to add various modifications and alterations to the invention within the technical scope as encompassed by the appended claims.

What is claimed is:

1. A centrifugal type friction clutch, comprising:
   a first rotary coupling member comprising a portion having a radially extending wall and a plural number of friction element support means on said radially extending wall;
   a second rotary coupling member having a cylindrical inner peripheral surface, disposed coaxially with said first rotary coupling member, for frictional engagement with said first rotary coupling member; and
   friction coupling elements supported by said friction element support means, each of said friction coupling elements comprising:
   a friction shoe having an arcuate portion with a frictional engaging surface;
   resilient retractor means, located between said friction shoe and said friction element support means, for biasing said friction shoe radially inward;
   cam means rotatably supported on said first rotary coupling member and having a curved cam surface; and
   a resilient thin strip located between said curved cam surface and said friction shoe, said cam means rotating and bearing against said resilient thin strip to displace said friction shoe radially outward according to the rotational speed of said first rotary coupling member, the cam angle between said cam means and said thin strip changing as said cam means pivots.

2. A centrifugal type friction clutch as set forth in claim 1, wherein said first rotary coupling member is an annular disk formed with notches on the outer periphery thereof for mounting said friction coupling elements, and said friction element support means include a plurality of paired projections provided around the outer periphery of said disk, each pair of said projections being located on opposite sides of said notches.

3. A centrifugal type friction clutch as set forth in claim 1, wherein said resilient retractor means is in the form of a thin strip.

4. A centrifugal type friction clutch as set forth in claim 1, wherein said cam means comprises a pair of cam weights adapted to stop operation at a predetermined rotational speed by abutting against each other.

5. A centrifugal type friction clutch as set forth in claim 1, wherein each of said cam means comprises a cam weight and a return spring.

6. A centrifugal type friction clutch as set forth in claim 1, wherein said resilient retractor and load means are integrated into a single, unitary member.

7. A centrifugal type friction clutch as set forth in claim 5, wherein said resilient retractor means and said return spring are integrated into a single structure, unitary member.

8. The centrifugal type friction clutch of claim 1 wherein said resilient thin strip has, in its relaxed state, a substantially straight central portion and said cam means bears against said central portion.

9. The centrifugal type friction clutch of claim 1 wherein said resilient thin strip has, in its relaxed state, a convex central portion and said cam means bears against said central portion.

10. A centrifugal type friction clutch in accordance with claim 4 wherein said first rotary coupling member is an annular disk formed with notches evenly spaced about its periphery with one of said friction coupling elements mounted in each of said notches, said pair of cam weights being pivotally mounted on a radial extension extending from the bottom of a notch.

11. A coupling mechanism, comprising:
- a disk coupled to either an input or output shaft and provided with friction element support means;
- a drum connected to the other of said output and input shafts and disposed coaxially with said disk around the outer periphery of said disk, said drum providing an interior cylindrical first frictional engaging surface;
- a fluid coupling provided between said input and output shafts; and
- a lock-up clutch comprising a plurality of friction coupling elements, each of said friction coupling elements including:
  - an arcuate friction shoe supported on said disk and having a second frictional engaging surface, for frictional engagement with said first frictional engaging surface, on the outer periphery thereof;
  - a cam weight pivotally supported on said disk, having a curved cam surface;
  - a load spring located between said curved cam surface and said friction shoe, said cam weight rotating and bearing against said load spring to displace said friction shoe radially outward according to the rotational speed of said rotary coupling member; and
  - a retractor spring located between said friction shoe and said friction element support means for biasing said friction shoe radially inward.

12. A coupling mechanism as set forth in claim 11, wherein said disk is in the form of an annular disk with notches at intervals around the outer periphery thereof for mounting said friction shoes, and said friction element support means includes a plurality of paired projections provided around the outer periphery of said disk, the member of each pair of said projections being located on opposite sides of said notches.

13. The coupling mechanism of claim 11 wherein said load spring has, in its relaxed state, a substantially straight central portion and said cam weight bears against said central portion.

14. The coupling mechanism of claim 11 wherein said load spring has, in its relaxes state, a convex central portion and said cam weight bears against said central portion.

15. The coupling mechanism of claim 13 wherein said retractor means has a substantially straight central portion that rests flat against said central portion of said resilient load means.

16. The coupling mechanism of claim 11 wherein said load spring is a leaf spring.

* * * * *